US012789223B2

(12) United States Patent
Kayhan et al.

(10) Patent No.: US 12,789,223 B2
(45) Date of Patent: Nov. 10, 2026

(54) METHOD FOR OPTIMIZING THE DISPENSING OF AN ADHESIVE

(71) Applicant: Henkel AG & Co. KGaA, Duesseldorf (DE)

(72) Inventors: Nalan Kayhan, Gruenstadt (DE); Julian Kirsch, Duesseldorf (DE)

(73) Assignee: HENKEL AG & CO. KGAA, Duesseldorf, NY (US)

( * ) Notice: Subject to any disclaimer, the term of this patent is extended or adjusted under 35 U.S.C. 154(b) by 0 days.

(21) Appl. No.: 18/721,589

(22) PCT Filed: Dec. 14, 2022

(86) PCT No.: PCT/EP2022/085813
§ 371 (c)(1),
(2) Date: Jun. 18, 2024

(87) PCT Pub. No.: WO2023/117619
PCT Pub. Date: Jun. 29, 2023

(65) Prior Publication Data

US 2025/0065359 A1 Feb. 27, 2025

(30) Foreign Application Priority Data

Dec. 22, 2021 (DE) ................................ 21216786.0

(51) Int. Cl.
*B05C 11/10* (2006.01)
*G05B 13/00* (2006.01)
*G06N 5/00* (2023.01)

(52) U.S. Cl.
CPC ...... *B05C 11/1015* (2013.01); *B05C 11/1005* (2013.01); *G05B 13/00* (2013.01); *G06N 5/00* (2013.01)

(58) Field of Classification Search
None
See application file for complete search history.

(56) References Cited

U.S. PATENT DOCUMENTS

2017/0120279 A1 5/2017 Choi
2020/0114388 A1 4/2020 Matsumoto et al.
2023/0091061 A1* 3/2023 Xu ........................... B05C 5/02 700/28

FOREIGN PATENT DOCUMENTS

WO 2021074745 A1 4/2021

* cited by examiner

*Primary Examiner* — James M Mellott
(74) *Attorney, Agent, or Firm* — Ingrassia Fisher & Lorenz, LLP

(57) ABSTRACT

The present disclosure provides a method and system for optimizing the dispensing of an adhesive from a dispensing device comprising a controllable setting. It consists in obtaining target parameters for a parameter of a structure formed by the adhesive after it is dispensed. Then a value of a local parameter near the dispensing device is obtained, which is a physical parameter of the adhesive in the dispensing device, an environmental condition near the dispensing device or a mechanical parameter of the dispensing device. Then a model of relationships between the local parameter, the parameter of the structure and intrinsic properties of the adhesive is generated. Using this model and the obtained values, a controllable setting for operating the dispensing device is determined to form a structure after dispensing of the adhesive that satisfies the target parameter.

12 Claims, 5 Drawing Sheets

METHOD FOR OPTIMIZING THE DISPENSING OF AN ADHESIVE

CROSS-REFERENCE TO RELATED APPLICATION

This application is a U.S. National-Stage entry under 35 U.S.C. § 371 based on International Application No. PCT/EP2022/085813, filed Dec. 14, 2022, which was published under PCT Article 21(2) and which claims priority to European Application No. 21216786.0, filed Dec. 22, 2021, which are all hereby incorporated in their entirety by reference.

TECHNICAL FIELD

The present disclosure relates to the field of controlling or optimizing the dispensing of an adhesive from a dispensing device, typically in an industrial manufacturing facility. The present disclosure more specifically teaches to adapt the parameters of the dispensing units (pumps, nozzles, conveyor belt moving the substrate onto which the adhesive is dispensed . . . ) so that the adhesive once dispensed maintains properties within predetermined values. This ensures that the adhesive meets the expected performance levels regardless of the local or environmental parameters at the dispensing site.

BACKGROUND

The properties of an adhesive can vary based on the conditions in which it is dispensed. In particular bond strength (also referred to hereafter as bonding strength) can depend on parameters such as the thickness of the layer that is formed on a substrate, also referred to as coat weight (hereafter sometimes referred to as coating weight), the nozzle pressure used to dispense the adhesive or the temperature of the adhesive during the dispensing step. Beyond the local parameters characterizing the state of the adhesive itself, other parameters can also influence the quality of the structure formed by the adhesive after it is dispensed.

One solution to compensate for any change in these parameters and to maintain a desired quality of the structure formed by the adhesive after it is dispensed is to adapt the values of settings of dispensing devices manually. Due to the complex interdependencies between many different parameters affecting the properties of structures formed by adhesives after they are dispensed, this manual adjustment based on a subjective human assessment of the parameters that need to be changed is often too slow and lacks precision.

Attempts at replacing the manual adjustment with automatic processes generally offer limited results as they consist in adding a detector measuring a parameter of the structure formed by the adhesive after it is dispensed coupled with a feedback loop acting on controllers operating the settings of the dispensing device. This approach does not prevent errors from occurring in the dispensing process in particular because the adjustments are made as a response to a detected deviation from desired properties of the structure formed by the adhesive after it is dispensed. However, deviations are not always noticeable on the go and a deviation from ideal parameters can gradually affect a production line before an acceptability threshold is reached above which deviations become detectable. In such cases many items are produced with nearly unacceptable conditions before the deviations become noticeable. In an industrial context, this leads to waste which is undesirable before the detection occurs.

For the above reasons, a device and method that can help optimize the dispensing of an adhesive from a dispensing device is sought.

BRIEF SUMMARY

A method implemented by a processor for optimizing the dispensing of an adhesive from a dispensing device comprises at least one controllable setting. The method also comprises obtaining at least one target parameter value for at least one parameter of a structure formed by the adhesive after it is dispensed, and obtaining at least one value of a local parameter in a vicinity of the dispensing device. The local parameter comprises at least one of: a physical parameter of the adhesive in the dispensing device, an environmental condition in the vicinity of the dispensing device, and a mechanical parameter of the dispensing device. The method further includes generating or obtaining a model that comprises a description of relationships between at least the at least one local parameter, the at least one parameter of the structure formed after it is dispensed, and intrinsic properties of the adhesive. The method includes determining, using the model and based on the at least one target parameter value and the value of the at least one local parameter, a set comprising at least one controllable setting for operating the dispensing device such that the set leads the dispensing device to form a structure after dispensing of the adhesive that satisfies the at least one target parameter. The method includes selecting the determined set for operating the dispensing device.

A system for optimizing the dispensing of an adhesive from a dispensing device includes at least one controllable setting. The system comprises a dispensing device configured to dispense the adhesive, a controller configured to operate the dispensing of the adhesive from the dispensing device, and a processor. The processor is configured to obtain at least one target parameter value for at least one parameter of a structure formed by the adhesive after it is dispensed. The processor also is to obtain at least one value of a local parameter in a vicinity of the dispensing device. The local parameter comprises at least one of: a physical parameter of the adhesive in the dispensing device, an environmental condition in the vicinity of the dispensing device, and a mechanical parameter of the dispensing device. The processor also is to generate or obtain a model that comprises a description of relationships between at least the at least one local parameter, the at least one parameter of the structure formed after it is dispensed, and intrinsic properties of the adhesive. The processor also determines, using the model and based on the at least one target parameter value and the value of the at least one local parameter, a set comprising at least one controllable setting for operating the dispensing device such that the set leads the dispensing device to form a structure after dispensing of the adhesive that satisfies the at least one target parameter. The controller is further configured to receive the determined set from the processor and select the determined set for operating the dispensing device.

A non-transitory computer readable medium comprises instructions thereon that when executed by a processor, cause the processor to operate by dispensing of an adhesive from a dispensing device comprising at least one controllable setting. The dispensing comprises obtaining at least one target parameter value for at least one parameter of a structure formed by the adhesive after it is dispensed. The dispensing comprises obtaining at least one value of a local parameter in a vicinity of the dispensing device. The local parameter comprises at least one of: a physical parameter of the adhesive in the dispensing device, an environmental condition in the vicinity of the dispensing device, or a mechanical parameter of the dispensing device. The dispensing includes generating or obtaining a model that comprises a description of relationships between at least the at least one local parameter, the at least one parameter of the structure formed after it is dispensed, and intrinsic properties of the adhesive. The dispensing includes determining, using the model and based on the at least one target parameter value and the value of the at least one local parameter, a set comprising at least one controllable setting for operating the dispensing device such that the set leads the dispensing device to form a structure after dispensing of the adhesive that satisfies the at least one target parameter. Also, the dispensing includes outputting the determined set for operating the dispensing device.

BRIEF DESCRIPTION OF THE DRAWINGS

The present disclosure will hereinafter be described in conjunction with the following drawing figures, wherein like numerals denote like elements, and.

DETAILED DESCRIPTION

Figure 1:
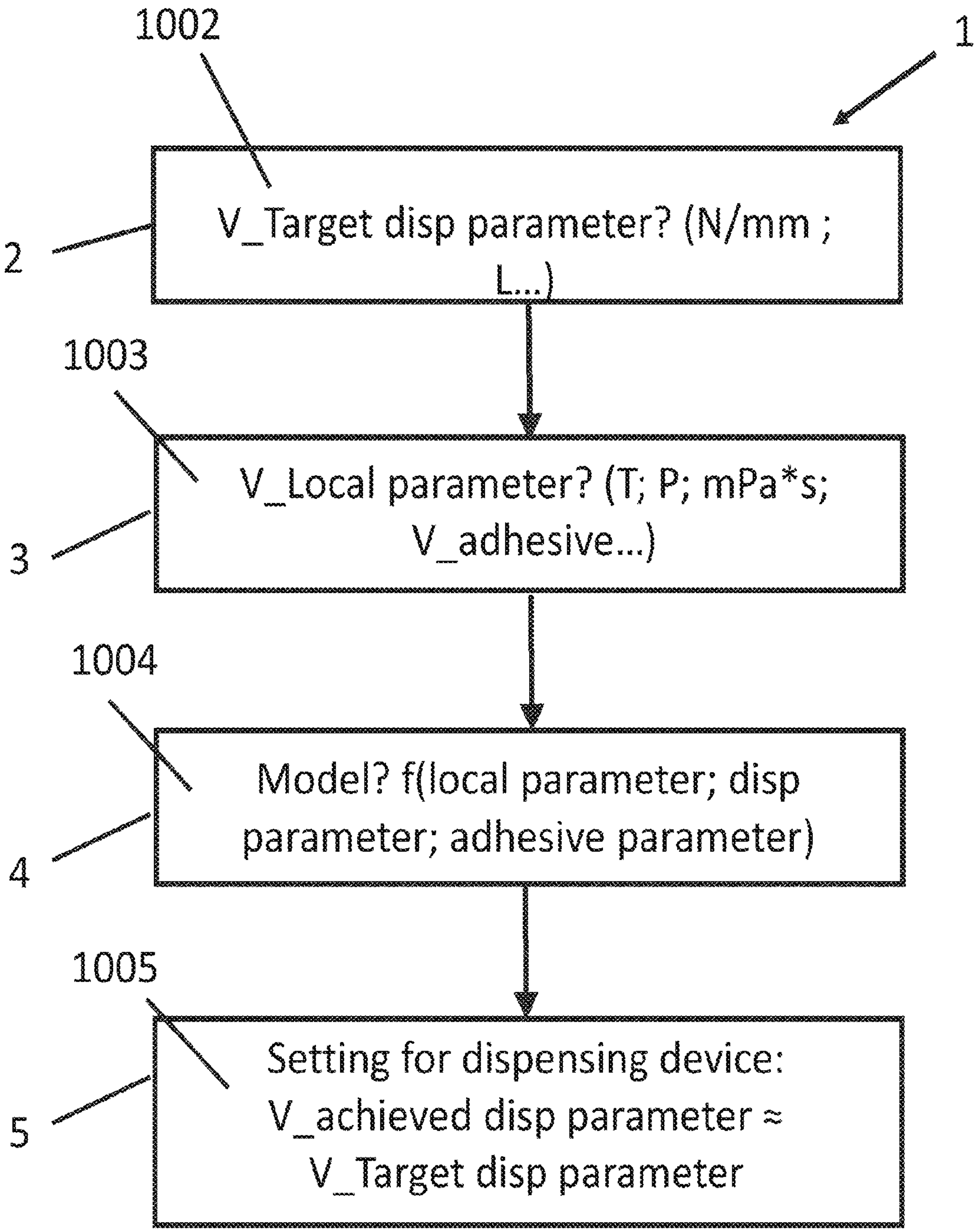
FIG. 1 is a flowchart showing steps of a method according to an exemplary embodiment.

The following detailed description is merely exemplary in nature and is not intended to limit the disclosure or the application and uses of the subject matter as described herein. Furthermore, there is no intention to be bound by any theory presented in the preceding background or the following detailed description.

The present disclosure enables a better optimization of the dispensing of an adhesive that takes into consideration the interplay between the properties of the adhesive, the environment in which the adhesive is dispensed, and the properties of the structure formed by the adhesive after it is dispensed (as defined for example by a user of the adhesive and the method of the present disclosure). Unlike typical approaches to adjusting the dispensing of an adhesive, the method of the present disclosure enables a more pro-active adjustment of the controllable parameters of a dispensing device. The method of the present disclosure can for example change the controllable parameters before a deviation in the local parameters in which the adhesive is dispensed start affecting the properties of the structure formed by the adhesive after it is dispensed. This approach reduces waste and increases satisfaction of the user.

By generating a model that includes dependencies between local parameters, intrinsic properties of the adhesive and properties of the adhesive after it is dispensed, the present disclosure provides a flexible way to adapt to any specific setup at a client's site. The present disclosure in particular overcomes the burden of having to make extensive manual calibrations or rely on insufficiently efficient standard feedback control loops or human intervention prone to errors to adjust the parameters of an adhesive dispensing setup.

"Obtaining" in the context of this present disclosure can for example refer to the acquisition of this information from an external source or a memory. The information can for example be accessed in a cloud, a remote or local database or be provided by a user via a user interface or from a terminal of the user. Another alternative or supplemental approach is to generate the information by making an initial measurement to collect information relating to the functioning of the dispensing device, the conditions in the vicinity of the dispensing device and the behavior of the adhesive.

The term "vicinity" typically refers to the conditions in a room in which the dispensing device is located.

The term "controllable setting" refers for example to a setting such as flow rate of the adhesive through a nozzle of the dispensing device, a temperature in a room in which the dispensing device is located, a pressure exerted on the adhesive, a speed at which a substrate on which the adhesive is dispensed moves, a temperature applied to the adhesive to heat it up or cool it down in the dispensing device.

The term "structure formed by an adhesive after it is dispensed" can refer to any type of shape or size that adhesives typically form after they are dispensed. These shapes and features of a dispensed adhesive depend on the use of the adhesive. In the electronics industry, adhesives are often dispensed in the form of beads for example. In other applications (such as for example end-of-line packaging or nonwoven/hygiene products, for example diapers), they may be dispensed as a line or layer that typically has a certain desired thickness. Other applications can lead to user-specific requirements that can be expressed in numerical values, value ranges or qualitative descriptions of the desired properties of the adhesive.

The term "physical parameter of the adhesive in the dispensing device" refers to a parameter that is measurable such as the pressure exerted on the adhesive, the pressure in the nozzle used to dispense the adhesive, the temperature of the adhesive, its viscosity. This term can resemble the term "intrinsic properties of the adhesive", however the intrinsic properties of the adhesive are not referring to a value specific to the context of the adhesive inside the dispensing device but rather describe either a static or dynamic property of the adhesive (such as for example its curing/setting temperature, the evolution of its bond strength as a function of coat weight or temperature . . . ).

According to an embodiment, the local parameter may comprise at least one physical parameter of the adhesive in the dispensing device and an environmental condition in the vicinity of the dispensing device. It may also comprise physical parameter of the adhesive in the dispensing device and a mechanical parameter of the dispensing device. It may also comprise an environmental condition in the vicinity of the dispensing device and a mechanical parameter of the dispensing device. It may also comprise a physical parameter of the adhesive in the dispensing device, an environmental condition in the vicinity of the dispensing device and a mechanical parameter of the dispensing device.

By combining different types of local parameters the model that is generated is more accurate as it better reflects the dependencies between these parameters and their influence on the features of the adhesive that is dispensed. For example, the local parameters used as input may comprise a combination of a physical parameter of the adhesive (such as its temperature before dispensing, the volume occupied by the adhesive in the nozzle), an environmental condition in the vicinity of the dispensing device (typically the temperature, humidity among others) and a mechanical parameter of the dispensing device (for example application speed, nozzle pressure, temperature applied to the adhesive to melt or cure it). In combination, these values of local parameters provide a more complete description of the conditions that affect the features of the adhesive after it is dispensed, thereby enabling a better achievement of the desired target parameter value. In addition to these "local parameters" intrinsic properties of the adhesive such as its curing/setting temperature, its composition, a ratio of ingredients to be mixed before dispensing are also taken into consideration when generating the model. "Better" is to be understood as referring to, for example, a higher quality of the adhesive parameter after dispensing, a more efficient dispensing process for the dispensing of the adhesive.

According to an embodiment, the method may further comprise:

Monitoring values of the at least one parameter of the formed structure;

Initiate a determination of the set comprising at least one controllable setting for operating the dispensing device upon detecting that a difference between the monitored values of the at least one parameter of the formed structure and the at least one target parameter value is above a predetermined threshold.

Even though the present disclosure does not require an active monitoring of the parameter or parameters of the structure formed by the adhesive after it is dispensed, checking whether the predictions of the model are accurate can further prevent any unexpected deviations from predictions. This approach can further enable an iterative approach to train a learning algorithm that can update the model based on new input acquired during use of the dispensing device. The term "predetermined threshold" may typically refer to a relative difference of less than 10% or less than 5% or less than 1%.

It is to be noted that the method may further comprise:

Monitoring values of the at least one parameter of the formed structure;

Initiate a determination of the set comprising at least one controllable setting for operating the dispensing device upon detecting that a difference between the monitored values of the at least one parameter of the formed structure and the at least one target parameter value is below a predetermined threshold.

According to an embodiment, determining the set comprising at least one controllable setting for operating the dispensing device may comprise:

Determining achievable parameter values of a structure formed by the adhesive after it is dispensed based on the model;

Identifying achievable parameter values that match the at least one target parameter value or differ from the at least one target parameter value by less than a predetermined amount and identifying the set comprising the at least one controllable setting associated with these achievable parameter values.

The present disclosure provides some further flexibility in the selection of the most appropriate settings to operate the dispensing device. Indeed, the model may provide several good sets of controllable settings that enable to reach the desired target parameters for the structure formed by the adhesive after it is dispensed. The present disclosure can then output several sets of controllable setting values that the user can chose from. An automatic selection of the best match can also be programmed. The present disclosure might include a pre-programmed logic in selecting the best candidate among a plurality of sets of suitable controllable setting values, for example by selecting the one that involves the least energy consumption, the least adhesive consumption, the least emission of CO2, the one that increases the yield of the dispensing device.

According to an embodiment, the method may further comprise:

Determining more than one set comprising at least one controllable setting for operating the dispensing device;

Selecting a set among the more than one set which minimizes one among:

energy consumption;

adhesive consumption;

emission of CO2 gases;

time to dispense the adhesive.

According to an embodiment, the model may be generated using a machine learning algorithm that is trained on measured data obtained from previous use of the dispensing device and knowledge of the intrinsic properties of the adhesive.

The "previous use" can typically be from an initial run of the dispensing device to measure and understand the interdependencies between the different parameters occurring during the dispensing process, involving the local parameters (mechanical parameters of the dispensing device, parameters measurable in the vicinity of the dispensing device or properties of the adhesive in the dispensing device), parameters of the structure formed by the adhesive after it is dispensed and the behavior of the adhesive itself.

According to an embodiment, the model may be generated using a previous model obtained or generated in connection with at least one other dispensing device and/or at least one other target parameter comprising features differing from features of the dispensing device and target parameter by less than a fixed amount.

In some embodiments, it is possible to shorten the training step to generate the model by using a model that is already known from a previous implementation of the method on a similar setup, for example the same type of dispensing technology and/or using the same adhesive, for example for a similar application. It is also possible to combine an initialization of the method during which data specific to the dispensing task is acquired, but where additional "generic" data from previous similar setups is further fed into the algorithm.

The term "fixed amount" can for example refer to a relative difference of less than 20% or less than 10% or less than 5% or less than 1% in the values of identical parameters. The similarity between a current dispensing device setup and a previous one can be further defined as referring to a number of differences in the parameters to be taken into account of less than five or less than one. In essence, the concept of "similarity" between two setups for an adhesive dispensing device depends on the variable or variables that is or are changed given that the interdependencies between all parameters is often complex. However, experience acquired by implementing the method with different dispensing setups allows a clustering of the setups into categories of similarity. Models from similar setups can then be used in other setups of the same category.

According to an embodiment, the method may further comprise:

Obtaining a subset of at least one target fixed setting for the at least one controllable setting;

Determining the set of the at least one controllable setting further taking into account the subset of the least one target fixed setting.

In some embodiments, a user might set a constraint on a parameter of his dispensing setup that would otherwise be considered as a controllable setting (for example: the speed at which the substrate onto which the adhesive is dispensed moves with respect to the adhesive dispensing unit, or the adhesive temperature). When one such parameter needs to be fixed (and is considered as a constraint decided by the user), the method of the present disclosure is capable of finding a new model (an algorithm can also be considered as a "model" in the context of this present disclosure) taking into account this constraint to further keep the best possible quality for the structure formed by the adhesive after it is dispensed.

According to an embodiment, the local parameter may be at least one among:

A temperature of the adhesive;

A temperature inside a room in which the dispensing device is located;

A pressure exerted on the adhesive;

A nozzle pressure of the nozzle through which the adhesive is dispensed,

A pressure inside a room in which the dispensing device is located;

A speed at which a substrate on which the adhesive is dispensed moves with respect to the dispensing device;

A thickness of the adhesive structure after it is dispensed;

A bond strength of the adhesive structure after it is dispensed;

A flowrate at which the adhesive is dispensed from the dispensing device;

A material property of the substrate onto which the adhesive is to be dispensed;

A distance between a nozzle of the dispensing device and the substrate onto which the adhesive is dispensed.

According to an embodiment, the intrinsic properties of the adhesive may comprise at least one among:

A curing temperature of the adhesive;

A setting temperature of the adhesive;

A ratio of constituents of the adhesive, that are mixed together at the time of dispensing;

A viscosity of the adhesive;

A thermal conductivity of the adhesive;

An electrical conductivity of the adhesive;

A bonding strength of the adhesive;

A function describing the bonding strength of the adhesive as a function of adhesive temperature and adhesive viscosity;

A function describing the bonding strength of the adhesive as a function of adhesive coat weight.

According to an embodiment, the target parameter may comprise at least one among:

A bonding strength of the adhesive on a substrate onto which it is dispensed;

A width of an adhesive structure formed by the adhesive after it is dispensed;

A height of an adhesive structure formed by the adhesive after it is dispensed;

A shape of the structure formed by the adhesive after it is dispensed;

A homogeneity of the structure formed by the adhesive after it is dispensed.

Typically the bonding strength of the adhesive on the substrate is the bond strength of the adhesive applied so as to connect two surfaces together.

The adhesive structure can typically comprise a layer, a line or a bead.

The present disclosure also pertains to a system for optimizing the dispensing of an adhesive from a dispensing device comprising at least one controllable setting, the system comprising:

A dispensing device, configured to dispense the adhesive;

A controller, configured to operate the dispensing of the adhesive from the dispensing device;

A processor, the processor being configured to:

Obtain at least one target parameter value for at least one parameter of a structure formed by the adhesive after it is dispensed;

Obtain at least one value of a local parameter in a vicinity of the dispensing device, the local parameter comprising at least one among a physical parameter of the adhesive in the dispensing device, an environmental condition in the vicinity of the dispensing device and a mechanical parameter of the dispensing device;

Generate or obtain a model that comprises a description of relationships between at least the at least one local parameter, the at least one parameter of the structure formed after it is dispensed and intrinsic properties of the adhesive;

Determine, using the model and based on the at least one target parameter value and the value of the at least one local parameter, a set comprising at least one controllable setting for operating the dispensing device such that said set leads the dispensing device to form a structure after dispensing of the adhesive that satisfies the at least one target parameter;

Wherein the controller is further configured to receive the determined set from the processor and select the determined set for operating the dispensing device.

This system is configured to implement the method described above.

According to an embodiment, the system may further comprise a measuring device configured to measured values of the at least one parameter of the formed structure, the measuring device comprising one among: an optical detector, a thermometer, a pressure sensor, a hydrometer.

According to an embodiment, the method may further comprise:

A user terminal configured to receive inputs regarding fixed local parameters and/or the target parameter value;

A platform comprising an algorithm configured to determine the set comprising the at least one controllable setting for operating the dispensing device, the platform being further configured to update the determined set based on input received from the user terminal.

In particular, the present disclosure can be implemented as part of an IoT solution to control and/or optimize the dispensing of an adhesive from a dispensing device. In such a setup, a user can interact with a platform stored for example in a cloud from his terminal (a portable device, a computer, a server for example). Information required for performing the method of the present disclosure, and in particular the algorithms that process the inputs to generate a model capable of controlling the parameters of the dispensing device can be received at this platform. This enables a more flexible approach to implementing the method of the present disclosure as a user can benefit from the best possible model predictions based on an up-to-date and regularly improved model that can centralize information received from different inputs.

The present disclosure further pertains to a computer program product comprising instructions for executing a method for optimizing the dispensing of an adhesive from a dispensing device comprising at least one controllable setting, the method comprising:

Obtaining at least one target parameter value for at least one parameter of a structure formed by the adhesive after it is dispensed;

Obtaining at least one value of a local parameter in a vicinity of the dispensing device, the local parameter comprising at least one among a physical parameter of the adhesive in the dispensing device, an environmental condition in the vicinity of the dispensing device and a mechanical parameter of the dispensing device;

Generating or obtaining a model that comprises a description of relationships between at least the at least one local parameter, the at least one parameter of the structure formed after it is dispensed and intrinsic properties of the adhesive;

Determining, using the model and based on the at least one target parameter value and the value of the at least one local parameter, a set comprising at least one controllable setting for operating the dispensing device such that said set leads the dispensing device to form a structure after dispensing of the adhesive that satisfies the at least one target parameter, outputting the determined set for operating the dispensing device.

The above computer program product can also be viewed as a non-transitory computer readable storage medium having stored thereon a computer program comprising instructions for execution of the method described above.

The present disclosure provides a method that is flexible and capable of performing well with all sorts of adhesive dispensing setups. It overcomes the standard feedback loop approach of the prior art and instead proposes to determine a set of controllable settings comprising at least one setting of a dispensing device that is predicted as being suitable to achieve a desirable target parameter for a structure formed by the adhesive after it is dispensed.

The exemplary embodiments illustrated in the drawings and commented below can comprise additional features that are not necessarily represented on the figures. Elements presented in connection with certain figures can also be combined to form further exemplary embodiments that fall within the definition of the appended claims.

The method of the present disclosure, steps of which are represented in more detail in FIG. 1 can for example be implemented to better control or optimize the dispensing of an adhesive from a dispensing device.

As represented on FIG. 1, the method 1 of the present disclosure can for example comprise a step of obtaining 2 at least one target parameter value 1002 for a parameter of a structure formed by the adhesive after it is dispensed. This target parameter value 1002 can either be a fixed value or a range of values. In order to input this value or this range, a user can for example provide the information as input via a user interface on a user terminal. Alternatively, it is also possible that the target parameter value 1002 is expressed in qualitative terms by a user, such as for example that the adhesive needs to have a certain shape or a certain deformability. It is then possible for example to enable a user to select among several "conditions" of a structure formed by the adhesive from a list that can for example be stored in a database of typical structures that an adhesive can form.

Among examples of target parameter values 1002 one can for example find the bond strength (or bonding strength) typically expressed in N/mm, the coating weight of the adhesive, the thickness, the width or the homogeneity of the structure formed by the adhesive after it is dispensed. This list is non limitative as the parameters can be expressed in different ways and depend on the requirement of a user.

As further illustrated on FIG. 1, the method 1 comprises a step of obtaining a value of a local parameter 1003 in the vicinity of the dispensing device. The local parameter 1003 can be one among a physical parameter of the adhesive in the dispensing device, an environmental condition in the vicinity of the dispensing device and a mechanical parameter of the dispensing device. For example, the local parameter 1003 can comprise a temperature of the adhesive, a temperature inside a room in which the dispensing device is located, a pressure exerted on the adhesive, a nozzle pressure, a pressure inside a room in which the dispensing device is located, a speed at which a substrate on which the adhesive is dispensed moves with respect to the dispensing device, a thickness of the adhesive structure after it is dispensed, a bond strength of the adhesive structure after it is dispensed, a flowrate at which the adhesive is dispensed from the dispensing device, a material property of the substrate onto which the adhesive is to be dispensed, a distance between a nozzle of the dispensing device and the substrate onto which the adhesive is dispensed. Further parameters can be defined depending on the context in which the adhesive is dispensed. The final nature of the local parameter 1003 can be setup dependent.

As further illustrated on FIG. 1, the method 1 comprises a step of obtaining or generating 4 a model 1004 that is based on the local parameter 1003, the parameter of the adhesive after it is dispensed (the target parameter or target parameters that is or are set by the user) and intrinsic properties of the adhesive. This model 1004 typically acts as a numerical description of the dependencies between these three (or more) parameters. The model 1004 can be obtained, in particular when a similar setup has already been used and is stored in a database. Then it can be assumed that the dependencies between the parameters are already known and can be applied without significant further modifications in connection with the current dispensing task.

Alternatively, or in addition to this approach in which a previous description of the relationships between these parameters is used as a basis for predicting the set of controllable parameters to operate the dispensing device, it is possible to go through an initialization phase during which measurements or other type of data is acquired about the dispensing device, the adhesive and the target parameters.

For example, a user can give to an adhesive provider or to any service provider that assists in implementing the method 1 of the present disclosure the target parameters that matter to him with a list of values (fixed values or ranges of values) for these parameters. The provider of the service or of the adhesive already has a better understanding of the static and dynamic behavior of the adhesive. This description of the adhesive can be summarized with functions that describe the response of the adhesive to different environmental or local parameters 1003. A digital twin or model of the adhesive might be available to describe these intrinsic properties of the adhesive.

By combining such knowledge about the intrinsic properties of the adhesive with the target parameters provided by the user and further with controllable parameters of a dispensing device, it is possible to generate a model 1004 usable to determine 5 a set 1005 of at least one controllable parameter value for the dispensing device that enables achieving the desired target parameter value 1002 or values.

A user can then set the determined values for the controllable parameters which is a process that can also occur automatically with the help of a controller operating the dispensing device.

Figure 2:
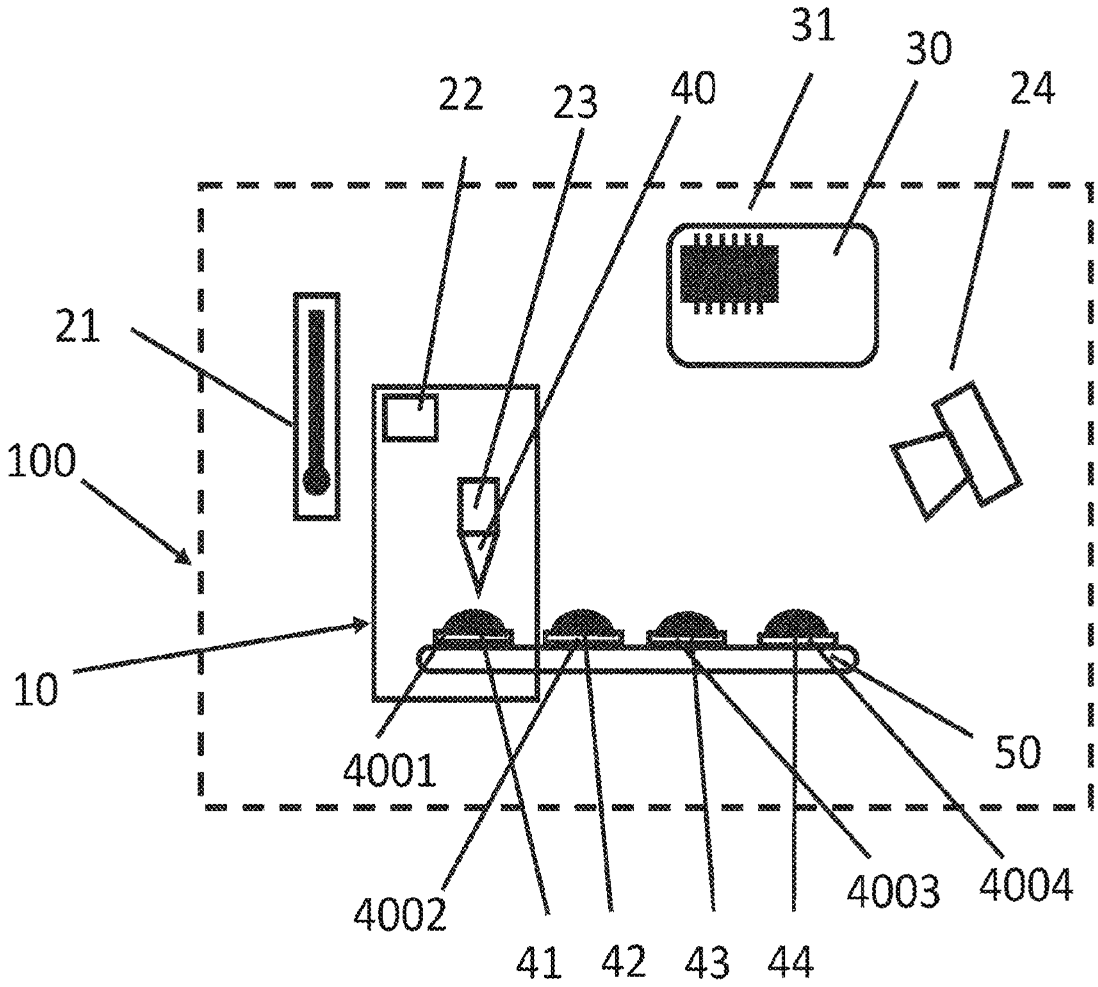
FIG. 2 is a schematic representation of a system comprising a dispensing device capable of running a method according to an exemplary embodiment.

To further illustrate how the method 1 of the present disclosure can be applied to a dispensing task, FIG. 2 provides a schematic illustration of a system 100 for optimizing the dispensing of an adhesive from a dispensing device according to an exemplary embodiment of the present disclosure.

As can be seen on FIG. 2, a dispensing device 10 may comprise a nozzle 40 and a container 23 comprising an adhesive therein. The adhesive is dispensed onto a substrate 4001, 4002, 4003, 4004 that can be placed on a moving belt 50 that moves with respect to the dispensing nozzle 40 of the dispensing device 10. The adhesive, when dispensed onto the substrate 4001-4004 forms a structure 41, 42, 43, 44. In the example illustrated on FIG. 2 the structures 41-44 are beads although the nature of that structure 41-44 depends on the dispensing task set by the implementor of the method 1 of the present disclosure.

The system 100 can further comprise a measuring device 21, 22, 24 capable of measuring a local parameter 1003 such as a temperature, a humidity, a pressure, a viscosity. The measuring device 21, 22, 24 can for example be a thermometer, a hygrometer, a camera or any other optical detector capable of acquiring an image or video stream of a part of the dispensing device 10 or the structure 41-44 formed by the adhesive.

The system 100 also comprises a controller 30. This controller 30 can comprise or cooperate with a processor 31 or part of a computer, a server that can be part of the dispensing device 10 itself. Typically, processor 31 receives the inputs described above and generates or obtains the model 1004 based thereon. The controller 30 further operates the dispensing device 10 by sending instructions to change the controllable settings on the dispensing device 10.

Figure 3:
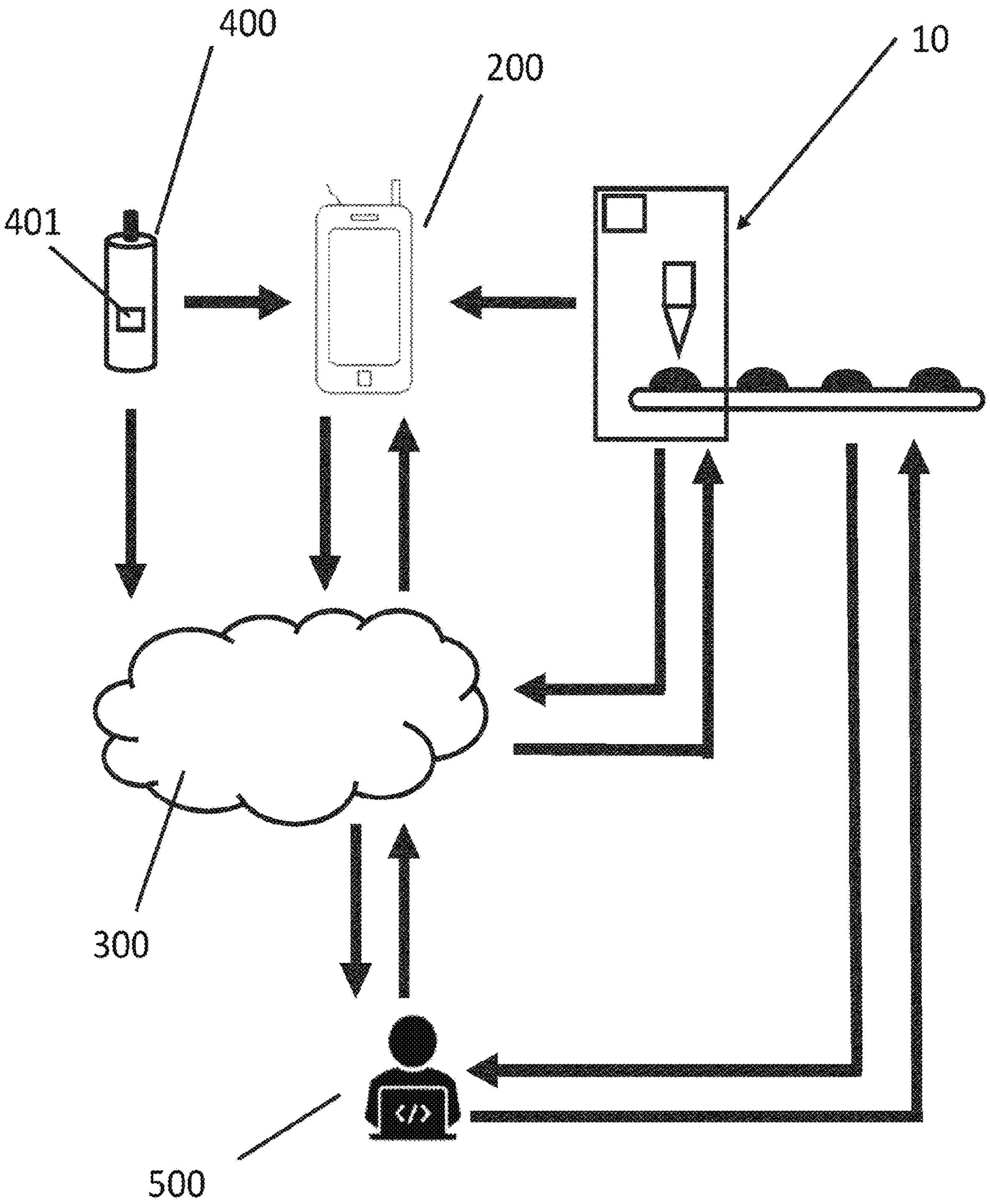
FIG. 3 is a schematic representation of a diagram of an enhanced system according to an exemplary embodiment.

The method 1 and system 100 of the present disclosure is further illustrated on FIG. 3. FIG. 3 shows a data enabled service including a dispensing device 10 a platform 300 such as a cloud infrastructure or similar type of central computing service, a user terminal 200, an adhesive product 400 with an identifier 401 and a service provider 500 capable of interacting with the platform 300 to update information therein or assist a user with the initial steps of gathering data usable to generate a model 1004 used to determine the sets of controllable parameter values.

This IoT (Internet of Things) data enabled service can for example rely on the one hand on the availability of information about the adhesive 400 used in the dispensing process of a user. The adhesive 400 that is used can be stored in a container comprising an identifier 401 such as for example a bar code, a label, a QR code, a distinctive pattern that can be read. When the identifier 401 is read, the information about the adhesive can be extracted for example from an access to the right database via platform 300 (a cloud architecture or any server, or other storage capability can provide access to a database).

Information about the adhesive can be provided to the platform 300 by the adhesive manufacturer. This information can be provided as static information about the intrinsic properties of the adhesive and/or as dynamic information about the intrinsic properties of the adhesive. Dynamic information can for example be provided as a function or several functions describing the response of the adhesive as a function of parameters such as for example coat weight, viscosity, temperature, pressure, flow rate. Some exemplary graphical representations of such models are provided for illustrative purposes on FIGS. 4 and 5.

To read the identifier 401, a user can for example use a terminal 200 such as a portable terminal or any other device that can read the identifier such as a scanner or an optical detector. The terminal 200 can send the code that is identified to the platform 300 so that the platform 300 accesses the right database regarding the adhesive that was identified and submitted by the user. Information regarding the dispensing device 10 and the target parameters 1003 selected by the user can also be sent to the platform 300 either directly for example from the controller 30 or processor 31 of the dispensing device 10 or via the terminal 200. The platform 300 can act in lieu of or as an addition to processor 31 to generate or obtain the model 1004 that will be used to determine the set 1005 comprising the at least one controllable setting of the dispensing device 10.

In one exemplary embodiment. The platform 300 may generate or obtain the model 1004 and transmit it to the controller 30 or processor 31 of the dispensing device 10. In other embodiments, the platform 300 is not required or only accessed in case an update to the method 1 is available, for example because the adhesive manufacturer has prepared a better model 1004 of the behavior of the adhesive 400 that the controller 30 can use to make a more accurate model 1004 usable for controlling or optimizing the dispensing process.

As seen on FIG. 3, a service provider 500 can add information into the platform 300. This service provider 500 can for example integrate inputs it receives from a user during a first initialization of the method 1 of the present disclosure or in the event that there is not enough information to obtain or generate a model 1004 usable to implement the method 1 of the present disclosure. The service provider 500 can for example query the target parameter values 1002 (fixed values or value ranges) from the user, receive the intrinsic properties of the adhesive, and check the availability of pre-existing models 1004 for similar dispensing tasks in a database (for example in the platform 300) so that the effort required to initialize the implementation of the method 1 of the present disclosure is minimal. It is also possible to check the physical setup of the dispensing machine. The service provider 500 can for example participate in an observation and a first test run of the dispensing device 10 to acquire a certain amount of local parameter 1003 values needed to make the implementation of the method 1 successful. Acquisition of these data points can be done by studying the setup of the user, identifying the scales used to control different settings of the dispensing device 10 and collecting the available parameters that can be controlled and/or measured or determined when operating the dispensing device 10. Advantageously, the local parameters 1003 that are acquired comprise at least one among a physical parameter of the adhesive in the dispensing device 10, an environmental condition in the vicinity of the dispensing device 10 and a mechanical parameter of the dispensing device 10 as discussed above.

The terminal 200 can also receive notifications from the platform 300 for example to query whether the user is satisfied with the performance of the dispensing device 10. Performance feedback can also be sent to the user based on received information if the method 1 and system 100 also monitor and/or measure parameters of the dispensing device 10. The platform 300 may also provide the user via the terminal 200 with a suggestion to update certain parameters if a better model 1004 is available for optimizing the dispensing process.

Figure 4:
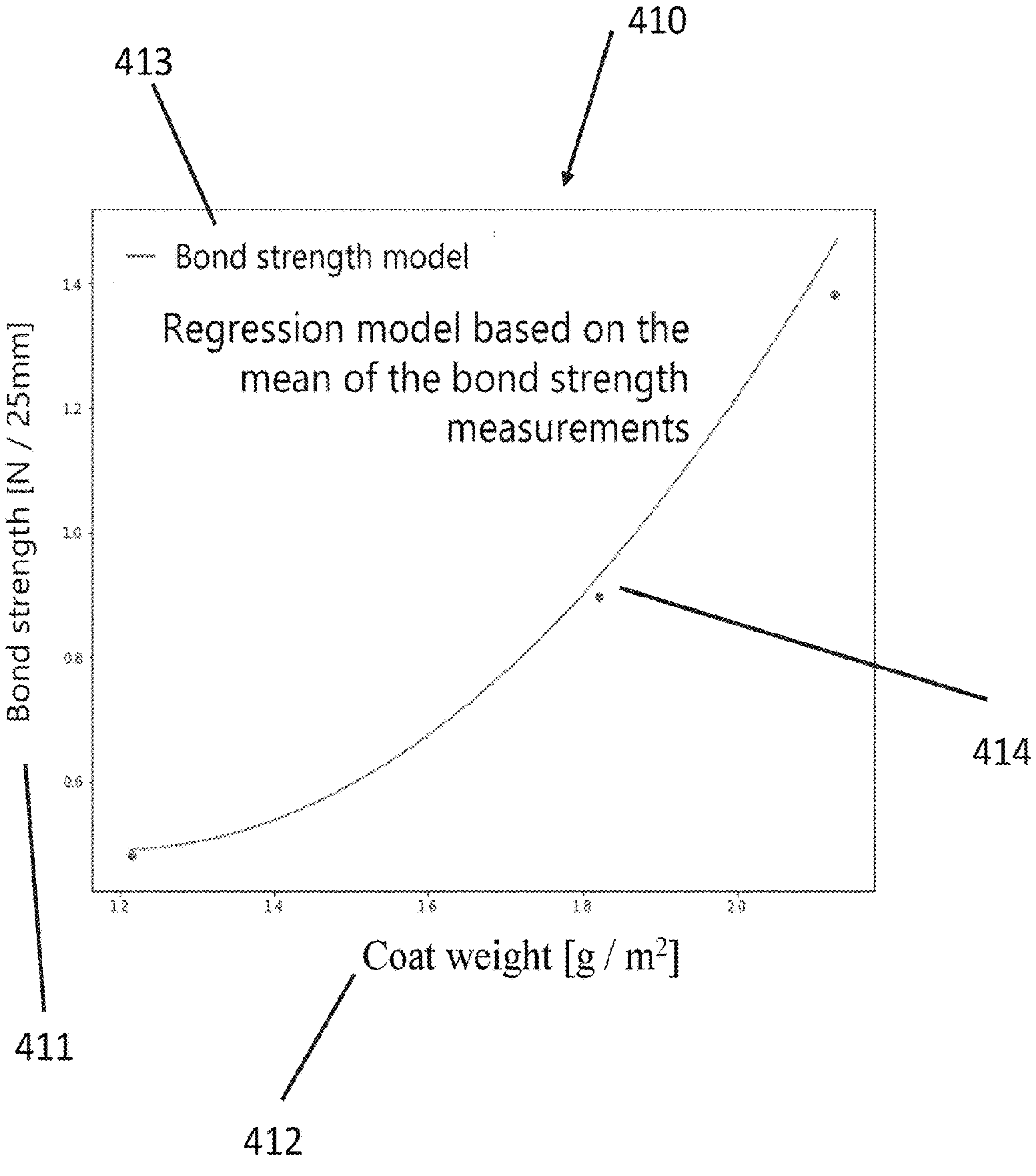
FIG. 4 is a schematic representation of a diagram showing a model describing the evolution of the bonding strength of an adhesive as a function of coat weight, usable to further integrate it into a model used in the method of an exemplary embodiment.

FIG. 4 provides one exemplary illustration 410 of a model describing the response of an adhesive as a function of coat weight. In particular, the bonding strength is modelled with a regression through acquired data points to provide some insights into the response of the adhesive to the amount of adhesive that is dispensed on a substrate. This simple model 413 comprises the coat weight on a horizontal axis 12 and the bonding strength on a vertical axis 411. The regression curve 414 can be associated to a mathematical function that can be used to generate the model 1004 used in the method 1 of the present disclosure.

Figure 5:
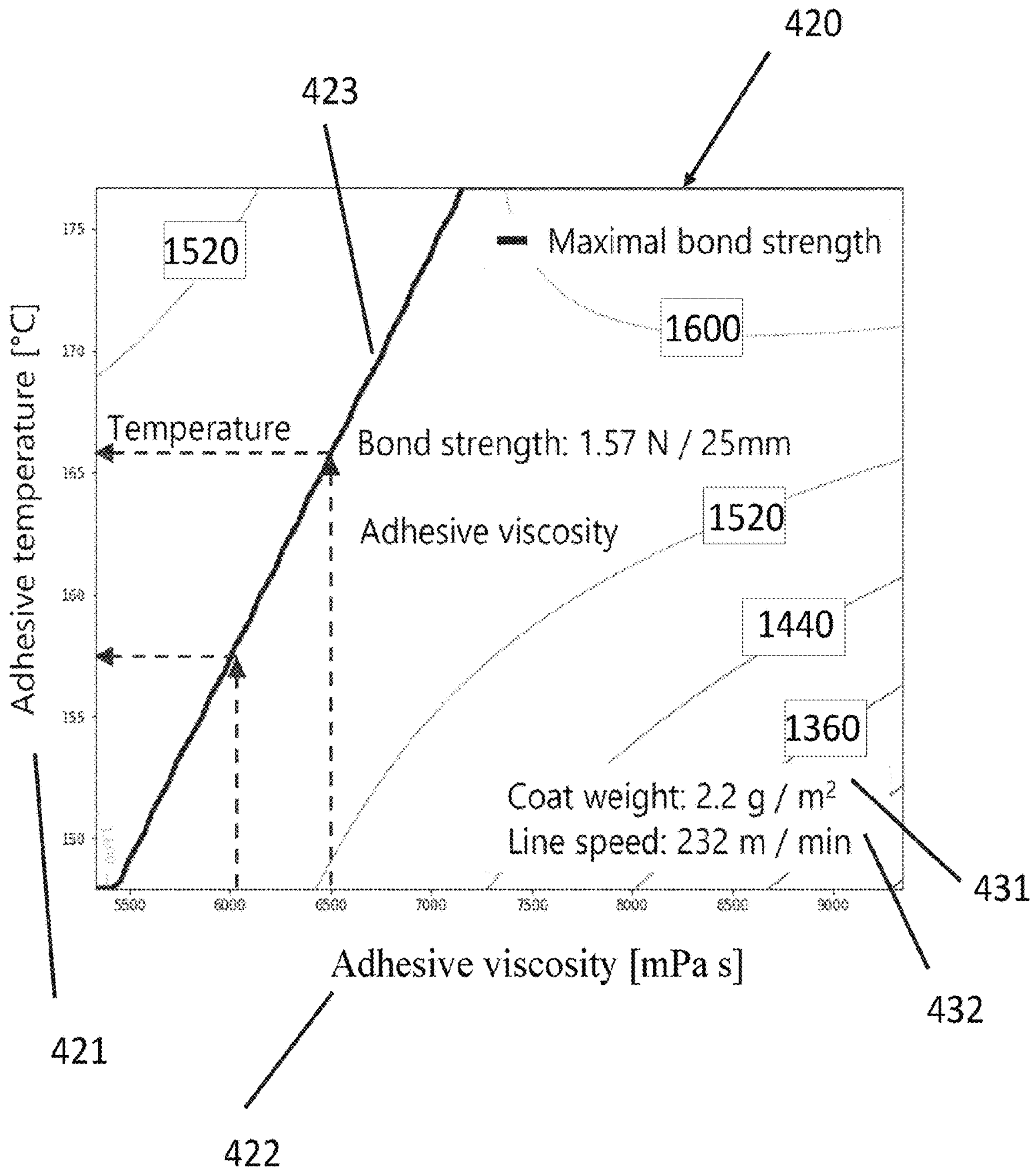
FIG. 5 is a schematic representation of a diagram showing another model describing the evolution of the bonding strength of an adhesive as a function of coat weight, usable to further integrate it into a model used in the method of an exemplary embodiment.

Since the response of an adhesive 400 also depends on other parameters, FIG. 5 provides the illustration 420 of a more sophisticated model that integrates the adhesive temperature on a vertical axis 421 (which is a local parameter 1003) the adhesive viscosity on a horizontal axis 422 and includes two fixed parameters with the coat weight 431 and the line speed 432 (speed at which the substrate moves with respect to the dispensing nozzle 40). It is to be noted that in some embodiments the dispensing nozzle 40 moves with respect to the substrate. The lines represented on FIG. 5 are schematic representations of a contour plot in which each line has a different value that is indicated numerically in the figure and corresponds to the bonding strength 423. If the target parameter desired by the user is to maximize the bonding strength, the contour plot of FIG. 5 provides a graphical representation of the optimal settings that should be respected to achieve this goal.

When generating or obtaining the model 1004 that comprises the interdependencies between the local parameter 1003 or local parameters, the target parameter 1002 or target parameters and the intrinsic properties of the adhesive, it is possible to generate functions of more variables than the examples represented on FIGS. 4 and 5. In complex cases, the multidimensional function corresponding to the model 1004 cannot be represented visually but can be used mathematically to find a set 1005 of suitable parameter values to achieve the desired targets sets by the user.

The use of the model 1004 can be viewed as a mathematical problem corresponding to finding a global optimum of the function across the values achievable by the function with the controllable parameters of that function. Known mathematical tools to solve such equations can be used.

Since an adhesive 400 may have a response to controllable settings that provides several suitable candidate sets 1005 to achieve a desired target parameter value 1002 (fixed value or range of values), the present disclosure may further comprise a logic to select the best suitable candidate set 1005. For example, this selection can be based on energy consumption, adhesive consumption, emission of CO2 gases, time to dispense the adhesive.

The method 1 of the present disclosure can be applied to many different use cases. Among some non limitative examples, it is possible to use this method 1 to control the dispensing of an adhesive in diapers or feminine hygiene products, in which the quality requirements of the final product require specific adhesive dispensing processes to be respected.

Similarly, the method 1 of the present disclosure can be used to optimize the dispensing of adhesives in the electronics industry, for example in the deposition of adhesives used in the fabrication of communication devices, phones, smartphones, tablets. The quality of the bond strength in such applications and the homogeneity of the deposition is an important requirement in such industries. The term "quality" encompasses in particular the precision, in particular for small dispensed amounts.

In essence, the method 1 of the present disclosure can be applied in any other industrial context or even non industrial context in which the properties of an adhesive after it is dispensed need to fulfill particular requirements.

The steps of the examples and embodiments described above can be implemented by a processor such as a processor in a computer, or a computer itself. A computer program product comprising steps of the above-described method 1 can be used to implement the method 1 on a computer.

It is possible to store a computer program comprising instructions to implement the method of the present disclosure on different non-transitory computer readable storage mediums. These could for example comprise a processor or chip, FPGA (field programable gate array), an electronic circuit comprising several processors or chips, a hard drive, a flash or SD card, a USB stick, a CD-ROM or DVD-ROM or Blue-Ray disc, or a diskette.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method implemented by a processor for optimizing the dispensing of an adhesive from a dispensing device comprising at least one controllable setting, the method comprising:

obtaining, by a controller communicatively coupled to the dispensing device, at least one target parameter value for at least one parameter of a structure formed by the adhesive after it is dispensed;

measuring, by a measuring device in the dispensing device, physical parameters of the adhesive inside the dispensing device;

obtaining, by the controller, multiple values of local parameters in a vicinity of the dispensing device, the local parameters comprising at least the physical parameters of the adhesive in the dispensing device and measured in the dispensing device before the adhesive is dispensed, and at least one of: an environmental condition in the vicinity of the dispensing device and a mechanical parameter that is a setting of the dispensing device;

generating or obtaining, by the controller, a model that comprises a description of relationships between at least the at least one local parameter, the at least one parameter of the structure formed after it is dispensed and intrinsic properties of the adhesive;

determining, by the controller using the model and based on the at least one target parameter value and the value of the at least one local parameter, at least one set comprising at least one controllable setting for operating the dispensing device such that the set is used at the dispensing device to form a structure after dispensing of the adhesive that satisfies the at least one target parameter;

automatically selecting, by the controller, the determined set for operating the dispensing device;

automatically setting, by the controller, the selected set of controllable settings on the dispensing device; and dispensing, by the dispensing device, the adhesive by using the selected set of controllable settings to form a formed structure.

2. The method according to claim 1, further comprising:

monitoring values of the at least one parameter of the formed structure; and initiating a determination of the set comprising at least one controllable setting for operating the dispensing device upon detecting that a difference between the monitored values of the at least one parameter of the formed structure and the at least one target parameter value is above a predetermined threshold.

3. The method according to claim 1, wherein determining the set comprising at least one controllable setting for operating the dispensing device comprises:

determining achievable parameter values of a structure formed by the adhesive after it is dispensed based on the model;

identifying achievable parameter values that match the at least one target parameter value or differ from the at least one target parameter value by less than a predetermined amount; and identifying the set comprising the at least one controllable setting associated with the achievable parameter values.

4. The method according to claim 1, further comprising:

determining more than one set comprising at least one controllable setting for operating the dispensing device; and the selecting comprises selecting a set among the more than one set which minimizes at least one of:

energy consumption, adhesive consumption, emission of CO2 gases, or time to dispense the adhesive.

5. The method according to claim 1, wherein the model is generated using a machine learning algorithm that is trained on measured data obtained from previous use of the dispensing device and knowledge of the intrinsic properties of the adhesive.

6. The method according to claim 1, wherein the model is generated using a previous model obtained or generated in connection with:

at least one other dispensing device, and/or at least one other target parameter comprising features differing from features of the dispensing device and target parameter by less than a fixed amount.

7. The method according to claim 1, further comprising:

obtaining a subset of at least one target fixed setting for the at least one controllable setting; and determining the set of the at least one controllable setting further taking into account the subset of the least one target fixed setting.

8. The method according to claim 1, wherein the local parameter is at least one of:

a temperature of the adhesive, a temperature inside a room in which the dispensing device is located, a pressure exerted on the adhesive, a nozzle pressure of the nozzle through which the adhesive is dispensed, a pressure inside a room in which the dispensing device is located, a speed at which a substrate on which the adhesive is dispensed moves with respect to the dispensing device, a thickness of the adhesive structure after it is dispensed, a bond strength of the adhesive structure after it is dispensed, a flowrate at which the adhesive is dispensed from the dispensing device, a material property of the substrate onto which the adhesive is to be dispensed, or a distance between a nozzle of the dispensing device and the substrate onto which the adhesive is dispensed.

9. The method according to claim 1, wherein the intrinsic properties of the adhesive comprise at least one of:

a curing temperature of the adhesive, a setting temperature of the adhesive, a ratio of constituents of the adhesive that are mixed together at the time of dispensing, a viscosity of the adhesive, a thermal conductivity of the adhesive, an electrical conductivity of the adhesive, a bonding strength of the adhesive, a function describing the bonding strength of the adhesive as a function of adhesive temperature and adhesive viscosity, or a function describing the bonding strength of the adhesive as a function of adhesive coat weight.

10. The method according to claim 1, wherein the target parameter comprises at least one of:

a bonding strength of the adhesive on a substrate onto which it is dispensed, a width of an adhesive structure formed by the adhesive after it is dispensed, a height of an adhesive structure formed by the adhesive after it is dispensed, a shape of the structure formed by the adhesive after it is dispensed, or a homogeneity of the structure formed by the adhesive after it is dispensed.

11. The method of claim 1, wherein the local parameter of the adhesive measured in the dispensing device is at least one of:

a volume occupied by the adhesive in a nozzle of the dispensing device, a temperature of the adhesive measured in the dispensing device, a pressure exerted on the adhesive in the dispensing device, a nozzle pressure of a nozzle of the dispensing device through which the adhesive is dispensed, and a flowrate at which the adhesive is dispensed from the dispensing device.

12. The method of claim 1, wherein the measuring device is a first measuring device, and wherein the method comprises measuring, by a second measuring device, values of at least one parameter of the formed structure, the second measuring device comprising at least one of: an optical detector, a thermometer, a pressure sensor, or a hydrometer.

* * * * *